J. W. DAHMER.
VEGETABLE SLICER.
APPLICATION FILED AUG. 16, 1920.

1,430,289.

Patented Sept. 26, 1922.

*Inventor:*
John W. Dahmer
By John C. Higdon
Atty.

Patented Sept. 26, 1922.

1,430,289

UNITED STATES PATENT OFFICE.

JOHN W. DAHMER, OF FESTUS, MISSOURI.

VEGETABLE SLICER.

Application filed August 16, 1920. Serial No. 403,805.

*To all whom it may concern:*

Be it known that I, JOHN W. DAHMER, a citizen of the United States, residing at Festus, Jefferson County, Missouri, have invented certain new and useful Improvements in Vegetable Slicers, of which the following is a specification containing a full, clear, and exact description, reference being had to the accompanying drawings, forming a part thereof.

My invention consists in the novel construction and arrangement of parts, hereinafter particularly described and distinctly claimed.

The object of my invention is to provide an improved vegetable slicer, which shall be simple and of low cost, and yet be capable of cutting turnips, potatoes, cabbage, and various other vegetables into thin narrow strips or slices, ready for use in all of the well known ways in which sliced vegetables are now utilized.

Figure 1:
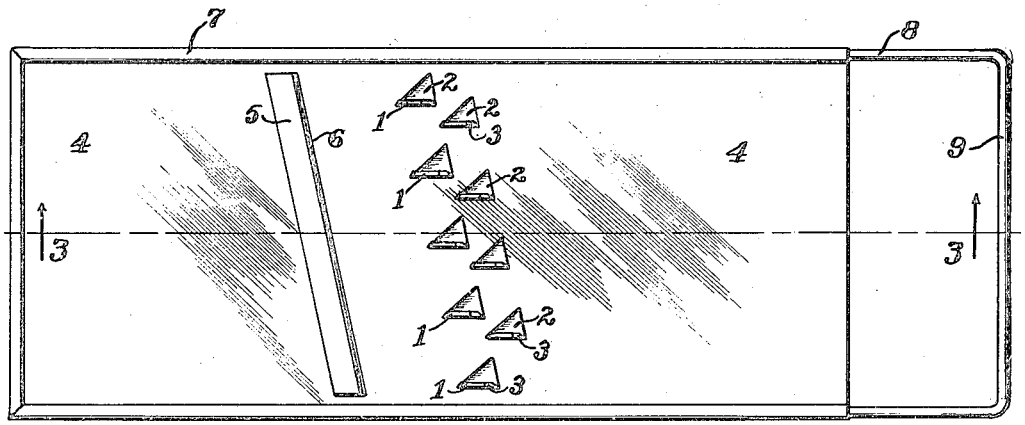
Fig. 1 is a top plan view of a vegetable slicer made in accordance with my invention.
Figure 2:
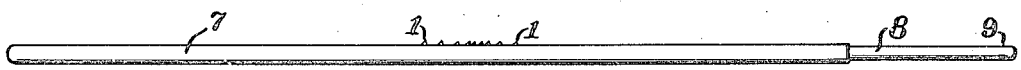
Fig. 2 is an edge view of same.
Figure 3:
Fig. 3 is a longitudinal section of same, taken on the line 3—3 of Fig. 1.

In the form herein shown, my invention is made from a single permanently flat blank sheet of steel having suitable size and thickness for the purpose required of it; and at a point near the middle of the length of said sheet a series of transverse rows of slitting-teeth 1 are struck up from the sheet by means of common punching-dies, so that said teeth will stand with their vertical sides at a right-angle to the surface of the sheet, and so that each tooth will be separated the width of the strip to be cut, from adjacent teeth.

Said teeth 1 are preferably, as shown, triangular in form, the apertures 2 that are cut in said sheet being of similar form.

All of the rows of teeth 1 are preferably on the bias, and the teeth of each row are staggered, to retain the strength of the sheet 4, and also to make the vegetable cutting easier at the beginning.

The numeral 3 designates the cutting edges of the teeth 1, said edges being sharpened with a file or some grinding device, so that the vegetables will be readily slitted by said teeth when the uncut body of the vegetable being slitted is slid upon the supporting-surface 4 of the invention into contact with and over said teeth.

In some cases, the cutting edges 3 of the teeth 1 may be inclined forwardly, as shown in Fig. 1, to prevent particles of the vegetables from being caught upon said teeth, and providing a draw-cut thereon during use.

A diagonal cutting-knife 5 is struck up from said sheet, by suitable punching-dies, at a point near to the said rows of teeth 1, the cutting-edge of said knife being sharpened by filing or grinding same, and said edge being located adjacent and projecting towards the said slitting-teeth 1, so that the material that has been slitted by the latter will be immediately thereafter cut off of the vegetable body by the said knife, and pass downwardly through a discharge-opening 6 in said sheet, into a suitable pan or other receptacle (not shown).

The cutting-edge of the said knife 5 stands always the same distance from the sheet, throughout the length of said knife, so that the strips or slices cut by the knife are of a uniform thickness from edge-to-edge.

The said knife 5 and the said teeth 1 are, of course, integral with the said sheet of metal from which they are struck up.

Said knife 5 also acts as a brace to strengthen the said sheet 4.

To stiffen the sheet carrying the knife 5 and the teeth 1, and to form a ledge on three sides of the operating surface of the invention, and thereby prevent the vegetables from sliding off the sheet, I form a marginal bead 7 on the opposite longitudinal edges thereof, and upon one end of said sheet.

A metallic wire or rod 8 is crimped in said beaded edges and end, to further strengthen same; and the said wire or rod is extended beyond the unbeaded end of said sheet, to form a handle 9 thereat, by means of which the implement may be held during use, and be hung up out of the way when not in use.

The operation of my invention will be readily understood from the above description.

I claim:—

An improved vegetable slicer, composed of a single permanently flat sheet of metal having a plurality of rows of integral forwardly inclined triangular staggered slitting-teeth struck up therefrom and extending diagonally across said sheet, and an integral reinforcing diagonal cutting-knife struck up from said sheet in the rear of and closely adjacent said slitting-teeth, substantially as and for the purpose set forth.

JOHN W. DAHMER.

Witnesses:
 EDWARD LUFT,
 JOHN C. HIGDON.